June 10, 1958     H. ERDMANN     2,837,948
RETAINING-RING APPLYING TOOLS
Filed Feb. 25, 1955     2 Sheets-Sheet 1

INVENTOR
HANS ERDMANN
BY
ATTORNEY

June 10, 1958 — H. ERDMANN — 2,837,948
RETAINING-RING APPLYING TOOLS
Filed Feb. 25, 1955 — 2 Sheets-Sheet 2
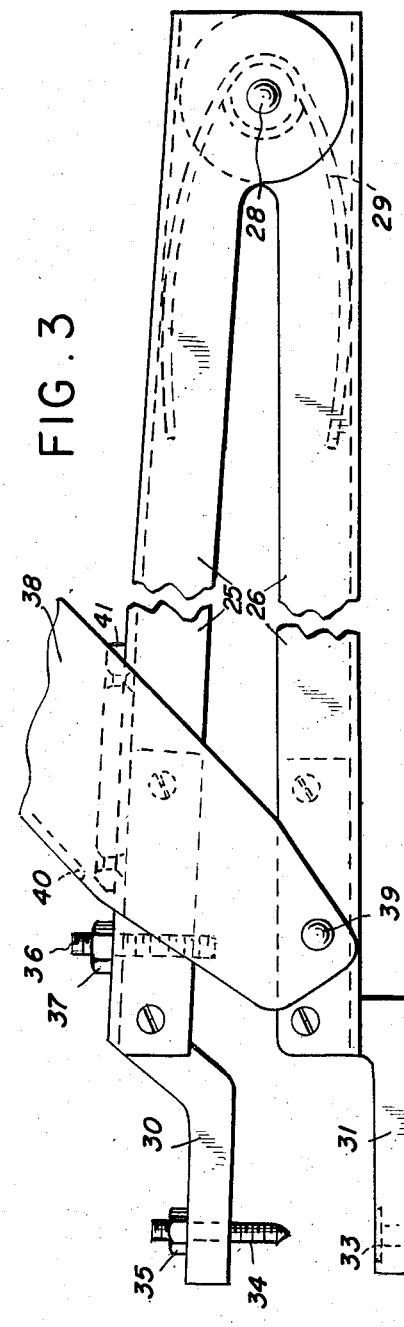
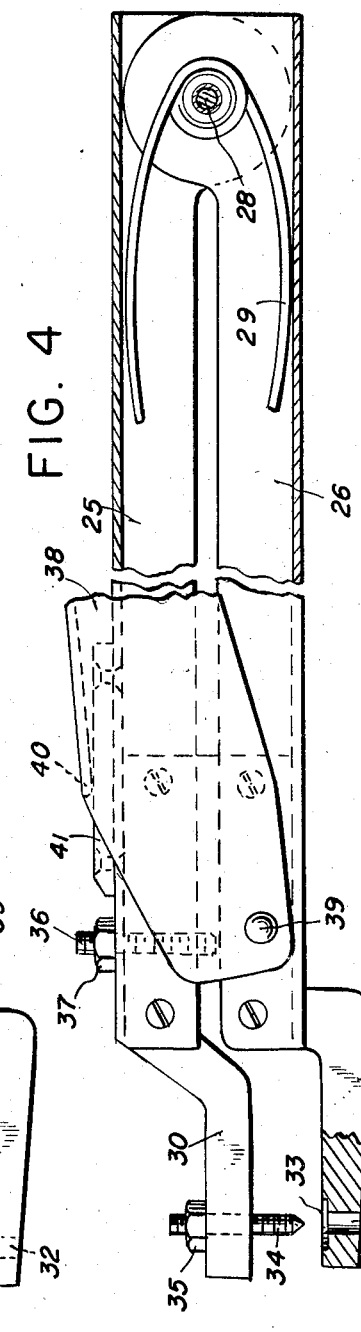
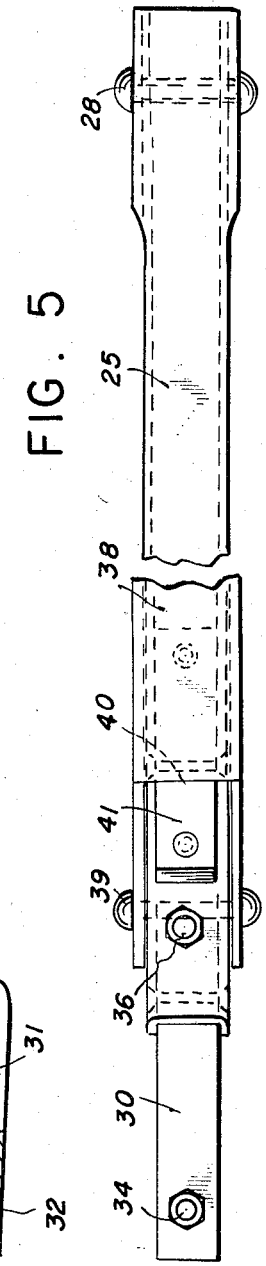
INVENTOR
HANS ERDMANN
BY *J. Harold Kilcoyne*
ATTORNEY United States Patent Office 2,837,948
Patented June 10, 1958

2,837,948

RETAINING-RING APPLYING TOOLS

Hans Erdmann, Maplewood, N. J., assignor to Waldes Kohinoor, Inc., Long Island City, N. Y., a corporation of New York Application February 25, 1955, Serial No. 490,485

7 Claims. (Cl. 81—5.1)

This invention relates to improvements in retaining-ring applying tools, and more particularly to an improved tool for assembling self-locking retaining rings on pins, rivets and the like.

As is well known, self-locking retaining rings are characterized by a closed ring body having locking prongs extending from its inner periphery, which are inclined by a small angle to the plane of the ring body. When such a ring is properly assembled on a pin, rivet or the like, the prongs are adapted to self-lock themselves to the peripheral surface thereof under thrust loads imposed on the ring body in a direction as to tend to cause the prongs to straighten. The assembly of such closed-bodied rings offers some difficulties, because not only must the applying pressure be distributed uniformly throughout the ring circle but also the ring body and pin or rivet must be accurately centered on the ring to insure against the ring taking an angularly inclined position. These difficulties become especially noticeable in mass assembly operations where speed is an essential requirement.

Generally stated, a major object of the invention is the provision of a tool for effecting the assembly of self-locking retaining rings on pins, rivets, etc., both accurately and speedily.

A more particular object of the invention is the provision of a tool as aforesaid incorporating means forming a seat for a retaining ring to be assembled and means for pushing the pin or rivet on which the ring is to be assembled through the ring opening, wherein said means are so related and cooperated that the applying pressure is uniformly distributed throughout the ring-body circle and the pin or rivet is accurately centered on said ring.

Yet another object of the invention is the provision of a tool characterized as aforesaid and which additionally incorporates means for predetermining the axial location of the assembled-ring on pin or rivet.

A still further object of the invention is the provision of a tool for assembling self-locking retaining rings on pins, rivets, etc., both speedily and accurately, whose design is such that it may be built to the form of a simple hand tool or to the form of a pedal operated bench-tool, depending on the preference and/or the particular requirements of the individual purchaser.

A still further object of the invention is the provision of a tool for use generally in assembling self-locking retaining rings on pins, rivets and the like, and which also has especial application in fastening rivets to parts, such as sheets or plates, being secured thereby.

The above and other objects and improved features will appear from the following detailed description of various forms of tools according to the invention, and which are illustratively shown in the following drawings, in which:

Fig. 3 is a side view of a modified form of assembly tool;

Fig. 4 is a view similar to Fig. 3 but illustrating the tool in closed position;

Figs. 5 and 6 are top plan and front-end views, respectively, of the tool as shown in Fig. 4;

Figure 1:
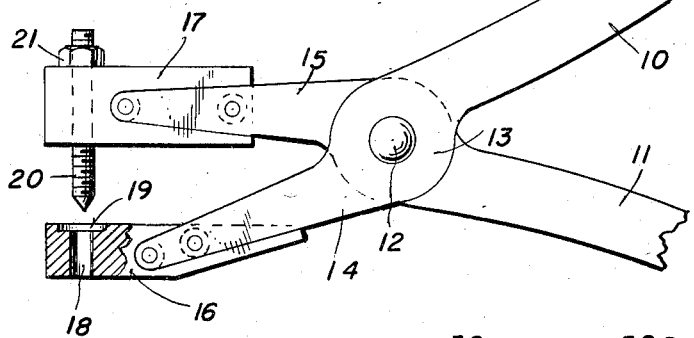
Fig. 1 is a side view of one form of tool for assembling self-locking retaining rings on a pin, rivet or the like according to the invention.
Figure 2:
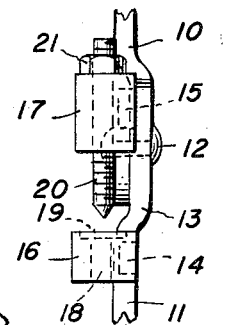
Fig. 2 is a front-end view thereof.
Figure 6:
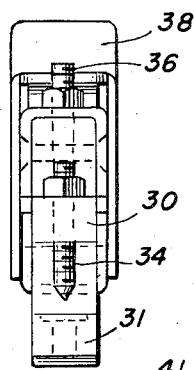

Referring to Figs. 1 and 2, illustrating a pliers-type of retaining ring assembly tool according to the present invention, reference numerals 10, 11 designate the handle ends of two crossed lever arms pivotally connected intermediate their ends by a pivot pin 12 having bearings in suitable hub portions 13, the tip or working ends of said arms being designated 14, 15. Rigidly secured to said tip ends of the arms are two plate-like head members 16, 17, the tip ends preferably seating in corresponding recesses formed in the side faces of said head members, (hereinafter for convenience called "heads"), so that the latter extend sidewardly of the tip ends, as best seen in Fig. 2. The lower head 16 is provided with a through (vertical) opening 18 of a diameter to accommodate the pin or rivet on which a self-locking retaining ring is to be assembled, and with a communicating shallow countersink 19 which opens through the upper face of the head, of a size to receive and seat said ring. Carried by the upper head 17 is a centering member 20 in the form of a screw which threads through the head, said screw being coaxially disposed to the opening 18 and countersink 19 when the handles are closed to bring the heads into parallelism, as shown. A lock nut 21 functions to hold the centering screw 20 in a desired position of axial adjustment.

Figs. 3–6 illustrate a modified form of retaining ring assembling tool according to the invention, such comprising two arms 25, 26 shown to have U section and arranged with their channels facing one another, and which are pivotally connected at their one ends, rather than intermediate their ends as in the Fig. 1 form, by a pivot pin 28. As best seen in Fig. 4, said arms 25, 26 are normally biased to an open or spread-apart position by a spring 29, which intermediate its ends is coiled about the pivot pin 28 so that its ends are reactive on both said arms. At their free ends, the arms carry heads 30, 31 corresponding to the aforementioned heads 16, 17 of the Fig. 1 form of tool, the head 31 having a hole 32 and countersunk recess 33 for the pin or rivet and the self-locking retaining ring, respectively, and the head 31 mounting a centering screw 34 and its lock nut 35. According to the tool form being described, the heads 30, 31 are offset downwardly from their attaching ends, which latter extend into the channels of the arms 25, 26, to which they are secured as illustrated. A screw 36 threaded through the upper arm 25 extends downwardly therefrom a predetermined distance which establishes the minimum spacing of the heads 30, 31. This distance is adjusted so as to bring said heads into parallelism and thereby the centering screw 34 into coaxial alignment with the hole 32 and countersink 33. A lock nut 37 is provided so as to lock the screw 34 in fixed adjusted position.

Preferably, the handles 25, 26 are closed, i. e., brought together by a hand lever 38 having a U-section and which is pivotally connected to the forward end of the lower arm 26 as by a pivot pin 39, so as to straddle the upper arm 25. Said hand lever 38 has a cross edge 40 which normally bears on the upper surface of an abutment rib or plate 41 which is disposed to underlie said edge and is secured flush against the top surface of the upper arm 25. Thus, as the hand lever 38 is swung downwardly (clockwise) from its Fig. 3 to its Fig. 4 position, it effects closing of the arms 25, 26 through engagement of its cross edge 40 with the abutment plate 41. By suitable shaping of said cross edge 40, the hand lever 38 can be made to effect closing of the arms 25, 26 at a faster rate during the earlier part of hand lever movement than during its final movement. This is a feature of advantage since the push force required to be applied to the pin or rivet by the head 31 is greatest during the final portion of handle movement, and this greatest push force is developed consequent to the hand lever moving at the slower rate.

Figure 9:
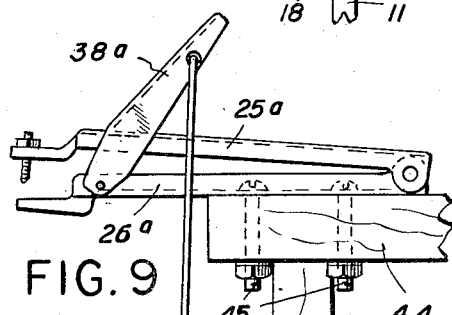
Fig. 9 is a diagrammatic view of a bench-type tool embodying the principles of the invention.

Fig. 9 illustrates a tool operating on the same principle as the Figs. 3–6 form of tool, but rather than being a simple hand tool, it is built into the form of a bench tool. In such latter form, the lower arm 26a which corresponds to the lever tool arm 26 (Fig. 3) is affixed to the top surface of a bench 44 as by bolts 45, and the hand lever 38a corresponding to the hand lever 38 (Fig. 3) is connected to a foot pedal 46 by a link 47. By such an arrangement, depression of the foot lever 46 effects closing of the arms 25a, 26a.

It will be understood that tools as described above may be used generally in applying a self-locking retaining ring to a pin or rivet, simply by placing a retaining ring to be assembled in the recess 19 or 33, with its prongs pointing downwardly into the opening or hole 18 or 32, thereupon inserting the pin or rivet into the space between the ring and the centering screw 20 or 34, and finally closing the tool arms so as to push the pin or rivet through the ring. However, the herein tool, in addition to operating as aforesaid, is also useful as a tool for fastening a rivet in and to parts such as plates or sheets to be secured to one another by said rivet, as will now be explained.

Figure 7:
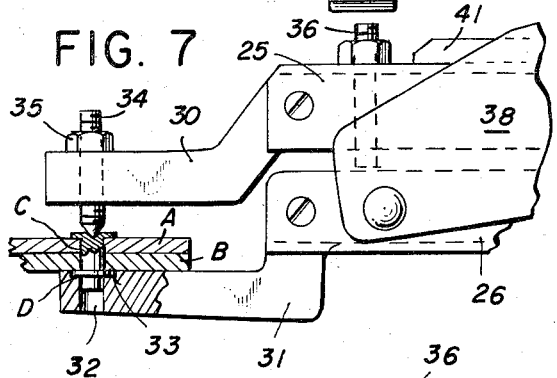
Fig. 7 is a broken away view, partly in section, illustrating one manner of using the assembly tool of the invention.

Referring to Fig. 7, illustrating the latter application of a tool of the form shown in Figs. 3–6 and 9, but which could also be a tool of the Figs. 1 and 2 form, reference characters A and B designate two sheets or plates to be secured by a rivet C fastened by a self-locking retainer ring D, the rivet being of the type whose head is provided with a central depression. First, the ring D is dropped into the countersunk recess 33 provided therefore, being turned or faced so that its prongs point downwardly or into the opening 32. Then the plates A, B with rivet C inserted through rivet holes provided therein are moved (or the tool is moved to said plates) to a position such that the rivet C is disposed between the hole in the ring D and the inner (lower) end of the centering screw 34, which is pointed so as to complement the depression in the rivet head. The handles 25, 26 are now compressed and thereby the centering pin centers on and moves against the rivet, pushing it through the retaining ring D until the lower plate B presses tight against said ring. Here it will be noted that the adjustment of screw 34 is such as to effect the axial relationship of rivet and retaining ring as compresses tightly the plates A and B therebetween, and that the adjustment of screw 36 is such as to bring the heads 30, 31 into exact parallelism, whereby the rivet is accurately centered on the retaining ring, i. e. is disposed at right angles thereto. When presesure on the hand lever is relieved, the tool arms 25, 26 separate under the urge of spring 29, whereupon the plates A and B, now secured together by the rivet C, the latter being fastened in place by the retaining ring D which has self-locked itself thereto, may be withdrawn from the tool, or vice versa.

Figure 8:
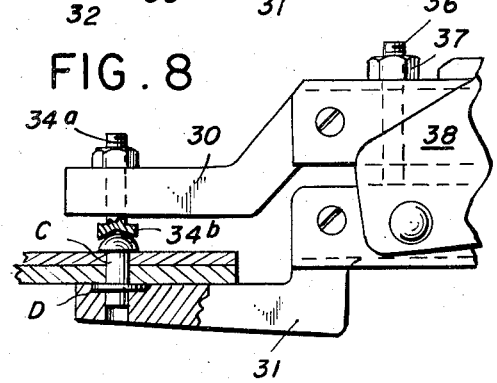
Fig. 8 is a view similar to Fig. 7 illustrating a somewhat different form of rivet-to-ring centering means.

Fig. 8 illustrates the herein tool in applying a rivet C having conventional rounded head. In such case, the centering screw 34a may be formed with an enlarged rivet-engaging end 34b having a concave under surface which complements that of the rivet head.

Without further analysis, it will be seen that tools according to the invention are well adapted to fulfill the objectives therefor as stated in the foregoing. However, it will be understood that various changes could be made in carrying out the above constructions without departing from the scope of the invention, and therefore it is intended that all matter contained in the above description or shown in the accompanying drawing shall be interpreted as illustrative and not in a limiting sense.

I claim:

1. A tool for assembling closed retaining rings having locking prongs extending from their inner edges on pins, rivets and the like, comprising a pair of arms mounted for relative movement toward and away from one another, heads affixed to corresponding ends of said arms and partaking of such relative movement means limiting approach movement of said arm ends past relative positions in which said heads are in parallelism, one head having a hole extending at a right angle through same of a diameter to accommodate the pin or rivet on which the retaining ring is to be assembled upon said pin or rivet being pushed axially into and partially through said retaining ring, and a full-circular shallow countersunk recess communicating with and extending about the inner end of the opening for receiving the retaining ring faced so that its prongs extend into said hole, the other head mounting a centering member extending at a right angle thereto and being generally aligned with said hole and positioned so that its inner end is adapted to engage on one end of said pin or rivet arranged so that its other end is in readiness to be pushed into the ring received in said recess as aforesaid, the construction and arrangement being such that movement of said arms toward one another results in the centering member pushing said pin or rivet partially through said retaining ring and in moving to a final position in which it is exactly coaxial with said hole and countersunk recess.

2. A tool as set forth in claim 1, wherein said arms are pivotally connected intermediate their ends in the manner of plier arms.

3. A tool as set forth in claim 1, wherein the arms are pivotally connected at their ends opposite those to which the heads are affixed.

4. A tool as set forth in claim 3, wherein spring means tending normally to spread said arms is operatively connected to said arms, and wherein a hand lever is pivotally connected to one arm and is adapted to press on the other arm to effect movement of said arms towards one another.

5. A tool as set forth in claim 4, wherein said one arm is provided with an abutment plate positioned and adapted to receive the pressure applied thereon by said hand lever.

6. A tool as set forth in claim 1, wherein the centering member comprises an adjustable-position screw.

7. A tool as set forth in claim 1, wherein said arms are pivotally connected at their ends opposite said corresponding ends, wherein spring means tending normally to spread said arms and lever means for actuating said arms towards one another are operatively connected thereto, and wherein pedal operated means for actuating said lever means are operatively connected to said lever means.

References Cited in the file of this patent

UNITED STATES PATENTS

| | | |
|---|---|---|
| 55,789 | Thompson | June 19, 1866 |
| 98,105 | Phillips | Dec. 21, 1869 |
| 453,920 | Sheehan | June 9, 1891 |
| 1,009,407 | Haberlein | Nov. 21, 1911 |
| 1,433,668 | Stein | Oct. 31, 1922 |
| 2,151,871 | Remenachneider | Mar. 28, 1939 |
| 2,253,906 | Lehman | Aug. 26, 1941 |
| 2,474,848 | Kern | July 5, 1949 |
| 2,496,611 | Warkentin | Feb. 7, 1950 |
| 2,594,942 | Lincoln | Apr. 29, 1952 |
| 2,657,600 | Stoffel | Nov. 3, 1953 |